(12) United States Patent
Dickens et al.

(10) Patent No.: US 8,065,571 B2
(45) Date of Patent: Nov. 22, 2011

(54) STORAGE AREA NETWORK (SAN) LINK INTEGRITY TESTER

(75) Inventors: Louie A. Dickens, Tucson, AZ (US); Olive P. Faries, Tucson, AZ (US); Michael E. Starling, Tucson, AZ (US); David L. Binning, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 12/250,605

(22) Filed: Oct. 14, 2008

(65) Prior Publication Data

US 2010/0095160 A1   Apr. 15, 2010

(51) Int. Cl.
*G11C 29/00* (2006.01)
*G01R 31/28* (2006.01)
*G01R 29/26* (2006.01)
*H04B 3/46* (2006.01)
*H04J 3/06* (2006.01)

(52) U.S. Cl. .......... 714/715; 714/712; 714/741; 702/36; 375/226; 375/371; 370/516

(58) Field of Classification Search ............... 714/712, 714/715, 741; 702/69; 375/226, 371; 370/516
See application file for complete search history.

(56) References Cited

U.S. PATENT DOCUMENTS

| | | | |
|---|---|---|---|
| 6,115,361 A * | 9/2000 | Fredericks et al. | 370/242 |
| 6,601,187 B1 | 7/2003 | Sicola et al. | |
| 6,658,540 B1 * | 12/2003 | Sicola et al. | 711/162 |
| 6,658,590 B1 * | 12/2003 | Sicola et al. | 714/6.21 |
| 7,111,189 B1 * | 9/2006 | Sicola et al. | 714/6.21 |
| 7,295,618 B2 | 11/2007 | Hsu et al. | |
| 2004/0057542 A1 | 3/2004 | Knapp et al. | |
| 2008/0077828 A1 * | 3/2008 | Sasaki | 714/715 |

* cited by examiner

Primary Examiner — John J Tabone, Jr.

(74) Attorney, Agent, or Firm — Hamilton & Terrile, LLP; Stephen A. Terrile (57) ABSTRACT

A tester that generates various data patterns to assure that link receivers and transmitters are functioning properly (i.e., are functioning according to a relevant network specification) across the entire storage area network. In various embodiments, this tester may be used in Fibre Channel type SANs or in fiber connectivity (FICON) type SANs.

18 Claims, 6 Drawing Sheets

STORAGE AREA NETWORK (SAN) LINK INTEGRITY TESTER

BACKGROUND OF THE INVENTION

1. Field of the Invention

The present invention generally relates to a storage area network ("SAN") employing a plurality of Fibre Channel switches which are connected together to form a fabric. The present invention specifically relates to a storage area network link integrity tester.

2. Description of the Related Art

Figure 1:
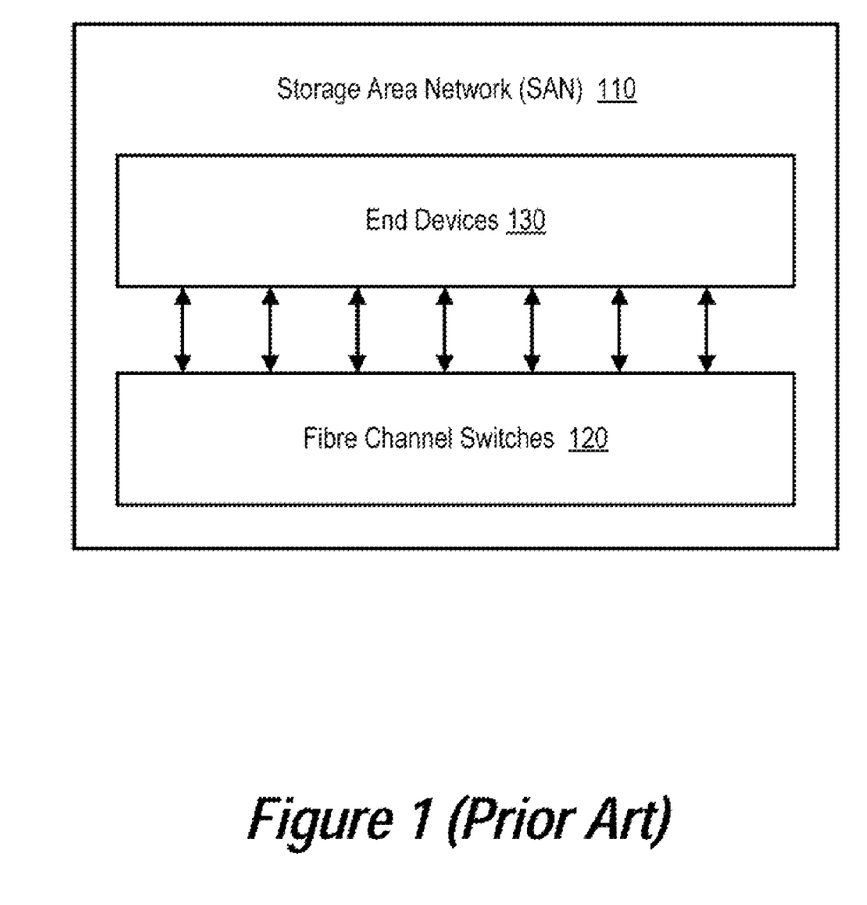
FIG. 1 illustrates a SAN employing one or more fibre channel switches and a plurality of end devices.

FIG. 1 illustrates a SAN 110 employing one or more fibre channel switches 20 and a plurality of end devices 30. As known in the art, fibre channel switches 20 are used to establish a fibre channel communication network topology (i.e., fabric) providing direct connections between end devices 30 (e.g., personal computers, workstations, servers and the like). Testing of the fibre channel communication network topology often requires the use of a large quantity of expensive equipment, particularly a large quantity of additional fibre channel switches 20 and end devices 30 for testing purposes.

With known SANs, higher data rates and embedded clocks can often result in greater susceptibility to link issues within the SAN. Link issues can include jitter and degrading bit error rate (BER) performance. Data Patterns that may produce jitter problems can be found discussed in the document T11.2/Project/230/Rev10 entitled *Fibre Channel—Methodologies for Jitter Specification*. The process to determine whether jitter, signal integrity, or degrading bit error rates exist is very complex and can require a great deal of expertise in the area of electronics and signal analysis. Jitter is an unwanted variation of one or more signal characteristics in electronics and telecommunications. Jitter may be seen in characteristics such as the interval between successive pulses, or the amplitude, frequency, or phase of successive cycles.

SUMMARY OF THE INVENTION

In accordance with the present invention, a go/no go tester is disclosed that generates various data patterns to assure that link receivers and transmitters are functioning properly (i.e., are functioning according to a relevant network specification) across the entire storage area network. In various embodiments, this tester may be used in Fibre Channel type SANs or in fiber connectivity (FICON) type SANs.

In certain embodiments, the tester includes a Fibre Channel adapter card. The tester uses a device driver that has a pass thru mode to issue the echo extended link service with a payload of data patterns that are known in the art of Fibre Channel to product jitter. The tester performs any setup required by the protocol to be able to send the I/O data patterns. This setup can include logins (e.g., fabric and port logins) and device discovery as necessary. In certain embodiments, the tester uses an echo extended link service to send data (the amount of data may be specified by a user or chosen randomly when the system is operating in an automatic mode of operation) with a specified data pattern (the data pattern may be specified by a user or may be sequential data patterns selected by default in an automatic mode of operation). The data is sent in an echo extended link service using the specified parameters.

The tester may include any of a plurality of operating modes. For example, in certain embodiments, the operating modes can include an automatic mode of operation or a user selectable mode of operation. In with automatic mode of operation, the tester send all possible random data patterns (e.g., starting at 00 thru ff) using random frame sizes and random numbers of frames. In the user selectable mode of operation, the user of the tester could specify the data pattern or a range of data patterns to use, and how much data to be sent in the echo extended link service. Any failing data patterns are compared against data patterns known in the art of Fibre Channel to create jitter. The results of the analysis are provided to a user. In certain embodiments, the results can include: jitter indicated because known jitter patterns failed or No indication of a jitter problem; a reply to the echo ELS was not received within the time-out period; an echo reply was received with a bad cyclic redundancy code (CRC); an echo reply was received with bad disparity; and an echo reply was received with an end of frame abort frame delimiter (EOFTA). In all modes, the end user will receive a report of success or failure and any other information that is applicable and available. One possible implementation could be, e.g., the data pattern FF, failed 4 out of 6 frames.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 2:
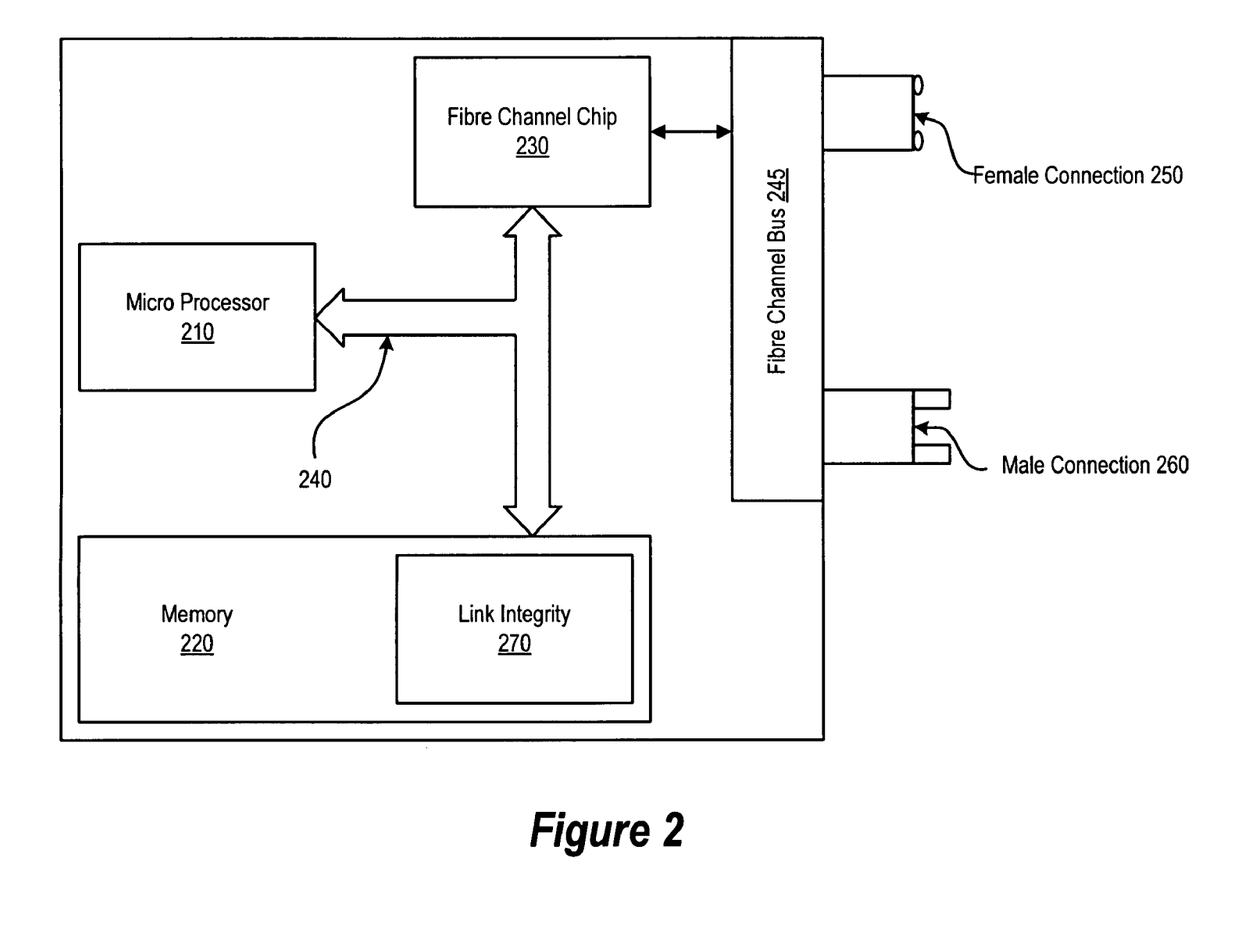
FIG. 2 shows a block diagram of a SAN link integrity tester.

Referring to FIG. 2, a block diagram of a SAN link integrity tester 200 is shown. The SAN link integrity tester provides an inexpensive portable device for link problem isolation and topology capabilities for use with a SAN 100. The SAN link integrity tester includes a processor 210, memory 220 and a fiber channel interface module 230. The processor 210, memory 220 and fibre channel interface module 230 communicate via a system bus 240. The memory 220 may include flash, a hard disk, optical storage, solid-state memory, or any other type of medium or a mixture of types.

The processor 210 controls the operation of the tester 200 via machine-readable code stored within the memory. The Fibre Channel interface module 230 includes one or more integrated circuits for communicating via a Fiber Channel type communication medium. The Fibre Channel interface module 230 is coupled to a Fibre Channel bus 245 which is in turn coupled to a female type Fibre Channel connector 250 and a male type Fibre Channel connector 260.

The memory stores a link integrity tester module 270. The link integrity tester module includes instructions executable by the processor for performing link integrity tests. The link integrity tester module further includes data patterns which are known to potentially induce jitter within a storage area network.

Figure 3:
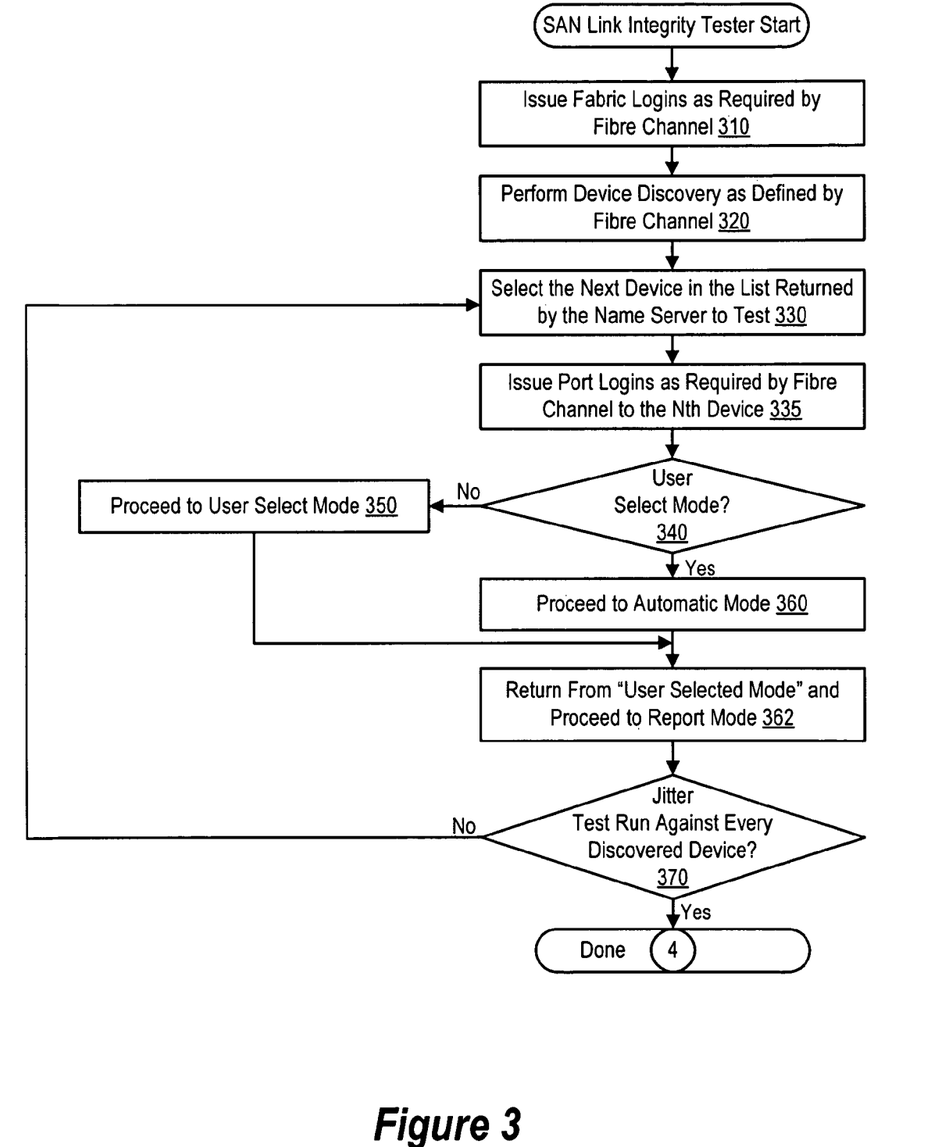
FIG. 3 shows a flow chart of the operation of a SAN link integrity tester when performing a login operation.

Referring to FIG. 3, a flow chart of the operation of a SAN link integrity tester when performing a login operation (such as a fabric login (FLOGI) operation) is shown. More specifically, in step 310, the tester 200 issues a frame referred to as a fabric login (FLOGI) frame. The fabric login frame is how the tester 200 communicates with the fabric of the SAN. Next, at step 320, the tester 200 port logs into a fabric name server and issues a name server query. Next, at step 330, the next device in the list that was returned by the query to the name server is selected by the tester 200. In operation, this device starts with the first entry and proceeds to the next entry each time the tester 200 loops back to step 330.

The tester 200 then performs a port login operation with the end device to be tested at step 335. Next, at step 340, a decision is made whether to operate the tester 200 in a user mode of operation or an automatic mode of operation. If the user mode of operation is selected by the user, then the operation proceeds to the user select mode of operation at step 350 (see e.g., FIG. 4). After the user mode of operation completes, the tester proceeds to a report mode of operation at step 352 (see e.g., FIG. 6).

Figure 5:
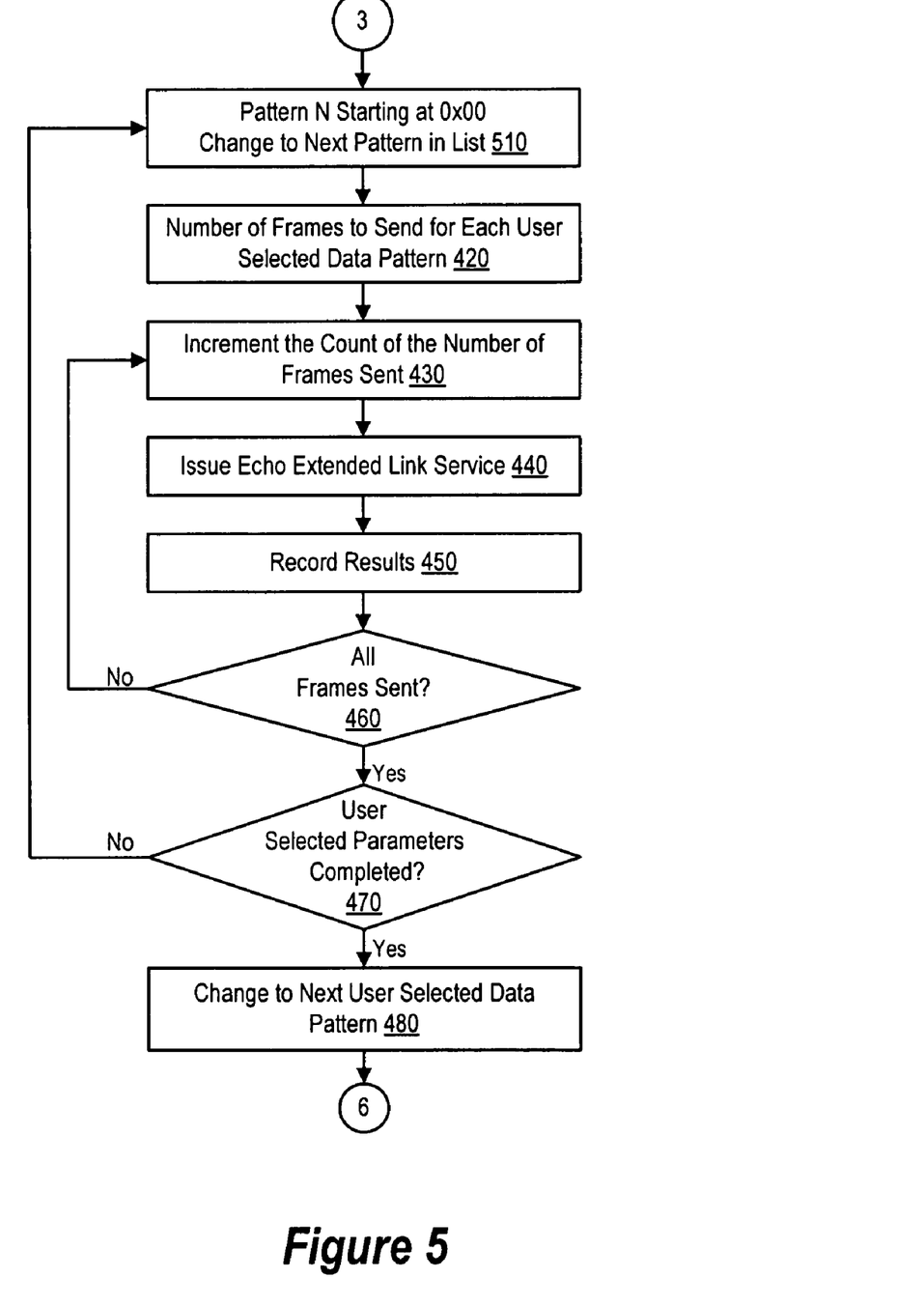
FIG. 5 shows a flow chart of the operation of a SAN link integrity tester when operating in an automatic mode of operation.

If the automatic mode of operation is selected by the user, then the operation proceeds to the automatic mode of operation at step 360 (see e.g., FIG. 5). After the automatic mode of operation completes, the test proceeds to a report mode of operation at step 352 (see e.g., FIG. 6).

When all of the testing (either via the user select mode of operation or the automatic mode of operation) completes and the report mode completes execution, the tester proceeds to step 370 where the tester 200 determines whether all the devices in the list returned by the name server have been tested. If all the devices have been tested then the tester 200 completes its operation. If all devices in the list returned by the name server have not been tested the process returns to step 330. At step 330, the next device in the list returned by the query to the name server is selected and the operation repeats. This testing and looping back and selecting the next device to be tested operation continues until all devices in the name server have been tested.

Figure 4:
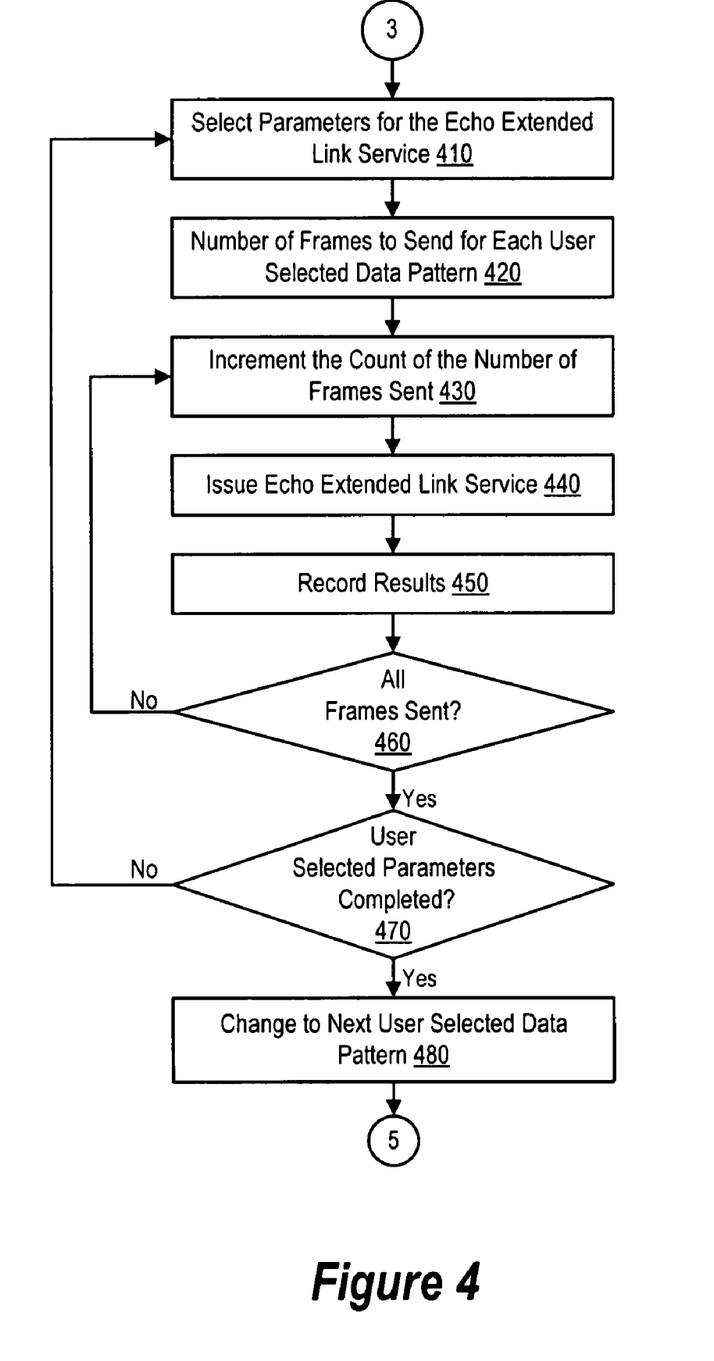
FIG. 4 shows a flow chart of the operation of a SAN link integrity tester when operating in a user selectable mode of operation.

Referring to FIG. 4, a flow chart of the operation of a SAN link integrity tester when operating in a user selectable mode of operation 350 is shown. More specifically, at step 410, a user selects the parameters to be used to build the payload of the frame of the fibre channel as an extended link services. The user selected data pattern is selected from a list of data patterns starting with the first pattern on the first time through and then moving to the next pattern in the list each time though. Any data pattern may be specified by the user. In certain embodiments, the tester 200 can supply a list of data patterns to be used. Next, the number of frames to be sent with the selected pattern is specified at step 420. A count of the number of frames that have been sent is incremented by one at step 430. Next, at step 440, an echo extended link service frame is sent with the selected data pattern. This specifically constructed frame is sent to the device under test. The results of the echo extended link service frame are recorded at step 450 as specified within the report mode of operation (see e.g., FIG. 6). If there are still additional frames to be sent as determined at step 460, then the operation returns to step 410. If all frames have been sent as determined at step 460, then the operation proceeds to determine whether if all the user-selected parameters have been exercised at step 470. If all of the frames have been sent, then the operation proceeds to the report mode of operation 352. If there are still parameters to be exercised, then the operation changes to the next user selected data pattern at step 480 and returns to step 410.

Referring to FIG. 5, a flow chart of the operation of a SAN link integrity tester when operating in an automatic mode of operation 360 is shown. More specifically, at step 510, the tester 200 automatically generates a pattern 'n' (which is automatically selected, starting at 0x00). Next, at step 520, the tester automatically generates a number of frames to transmit data pattern. Next, the tester 200 builds a frame 'f' with a data pattern payload at step 530. The tester 200 then generates a transmit echo link service command for the generated frame at step 540. The results are record at step 550. The recorded results include increment total frames transmitted and total patterns transmitted. Next at step 560 the tester 200 determines if the frame is the last frame of a series. If the frame is not the last frame of the series, then the tester increments a frame counter at step 562 and proceeds to build and transmit next frame by returning to step 520. If the frame is the last frame, then the tester proceeds to determine whether all data patterns have been sent (0xFF) at step 570. If all data patterns have not been transmitted, then a pattern counter is incremented at step 572 for the next data pattern and the tester 200 returns to step 510 to select the next pattern (which is identified via the pattern counter). If all data patterns have been transmitted, then the tester proceeds to the report mode of operation 352 (see e.g., FIG. 6).

Figure 6:
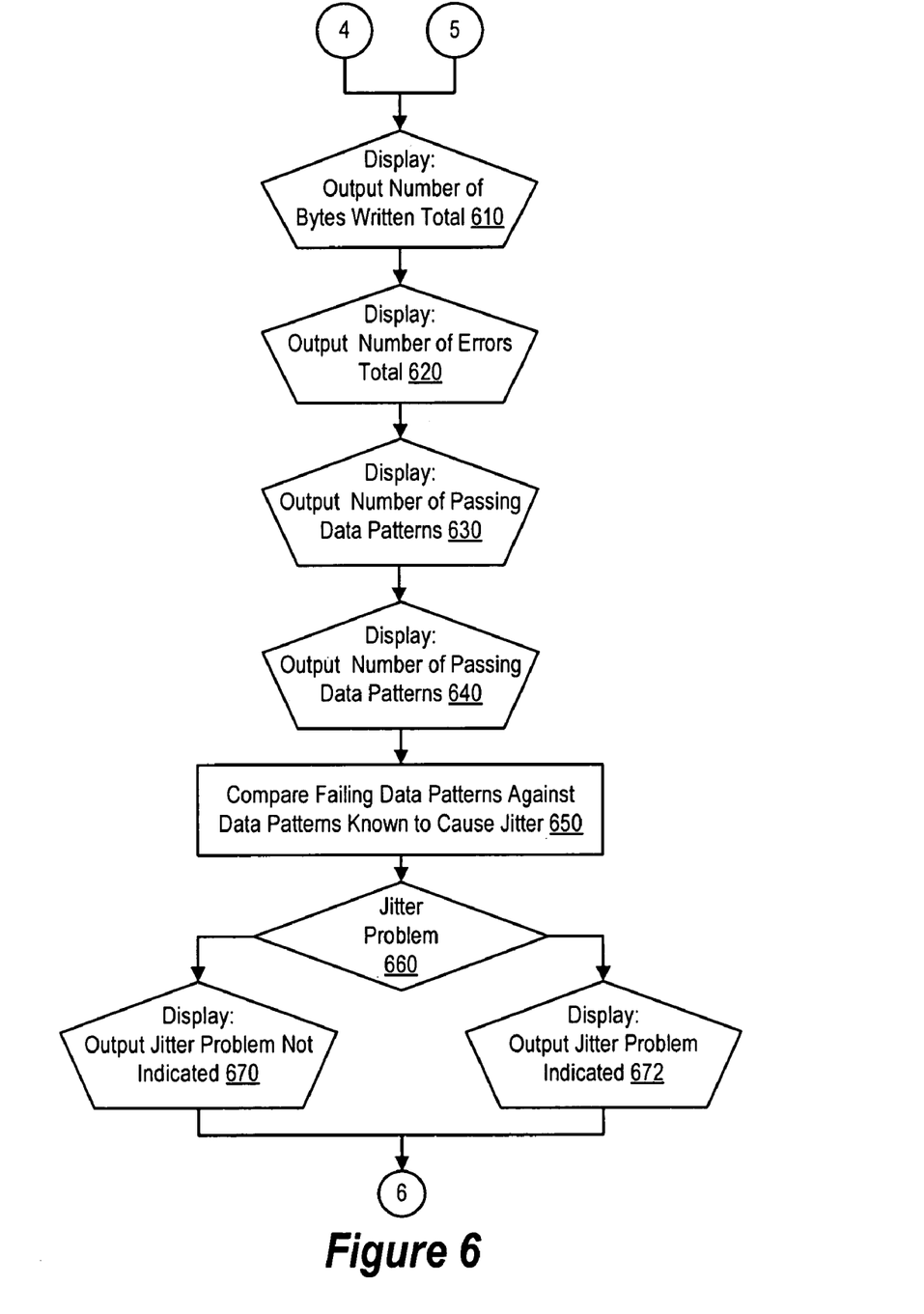
FIG. 6 shows a flow chart of the operation of a SAN link integrity tester when reporting test results.

Referring to FIG. 6, a flow chart of the operation of a SAN link integrity tester when reporting test results 352 is shown. With the report mode of operation, the reporting may be via a display of the results or by writing the results (e.g., either by storing the results to memory or by printing the results on some form of hard copy media. The report mode of operation reports a total number of bytes written to all devices, cumulative of all frames, at step 610. Next, the tester reports a total number of errors (or failures) logged during test cycle at step 620. Next, at step 630, for each error or failure reported, the related data pattern is reported (be it an auto generated or user selected data pattern). Next, at step 640 a total of all successful frames transmitted and total bytes successfully transmitted are reported. Next the tester 200 compares the failed data patterns to a library of data patterns known to cause jitter or known as strong indications of a jitter condition at step 650. The tester 200 evaluates the results of the comparison to determine whether a jitter condition or jitter indication is indicated at step 660. If no jitter problem is detected, then the tester reports that a jitter problem is not indicated at step 670 and returns operation to the link integrity tester operation. If a jitter problem is detected, then the tester 200 reports that a jitter problem is indicated at step 672 and returns operation to the link integrity tester operation.

It should be understood that at least some aspects of the present invention might alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A computer-implementable method comprising:
generating data patterns to assure that link receivers and transmitters within a storage area network are functioning properly; the data patterns comprising data patterns known to potentially induce jitter within the storage area network;
sending the data patterns via an echo extended link service operation;
monitoring results of the echo extended link service operation to determine whether the sending was successful, the sending being successful when the sending conforms to a network specification across the storage area network; and,
reporting whether the sending was successful.

2. The method of claim 1, wherein:
the storage area network comprises at least one of a Fibre Channel type storage area network and a fiber connectivity (FICON) type storage area network.

3. The method of claim 1, wherein the generating further comprises at least one of:
automatically generating sequential data patterns; and,
generating data patterns specified by a user.

4. The method of claim 3, wherein:
the automatically generating sequential data patterns further comprises sending a plurality of random data patterns using random frame sizes and random numbers of frames; and,
the generating data patterns specified by a user further comprises specifying a range of data patterns to use and how much data to send for the range of data patterns.

5. The method of claim 1, further comprising:
performing a setup operation prior to sending the data patterns, the setup operation comprising performing fabric and port login operations and device discovery operations.

6. The method of claim 1, the reporting further comprises at least one of:
reporting that jitter indicated because known jitter patterns failed or no indication of a jitter problem;
reporting a reply to the echo extended link service was not received within a time-out period;
reporting an echo reply was received with a bad cyclic redundancy code (CRC);
reporting an echo reply was received with bad disparity; and
reporting an echo reply was received with an end of frame abort frame delimiter (EOFTA).

7. A system comprising:
a processor;
a data bus coupled to the processor; and
a computer-usable medium embodying computer program code, the computer-usable medium being coupled to the data bus, the computer program code comprising instructions executable by the processor and configured for:
generating data patterns to assure that link receivers and transmitters within a storage area network are functioning properly; the data patterns comprising data patterns known to potentially induce jitter within the storage area network;
sending the data patterns via an echo extended link service operation;
monitoring results of the echo extended link service operation to determine whether the sending was successful, the sending being successful when the sending conforms to a network specification across the storage area network; and,
reporting whether the sending was successful.

8. The system of claim 7, wherein:
the storage area network comprises at least one of a Fibre Channel type storage area network and a fiber connectivity (FICON) type storage area network.

9. The system of claim 7, wherein the instructions for generating are further configured for:
automatically generating sequential data patterns; and;
generating data patterns specified by a user.

10. The system of claim 9, wherein:
the automatically generating sequential data patterns further comprises sending a plurality of random data patterns using random frame sizes and random numbers of frames; and,
the generating data patterns specified by a user further comprises specifying a range of data patterns to use and how much data to send for the range of data patterns.

11. The system of claim 7, wherein the instructions are further configured for:
performing a setup operation prior to sending the data patterns, the setup operation comprising performing fabric and port login operations and device discovery operations.

12. The system of claim 7, wherein the instructions for reporting are further configured for:
reporting that jitter indicated because known jitter patterns failed or no indication of a jitter problem;
reporting a reply to the echo extended link service was not received within a time-out period;
reporting an echo reply was received with a bad cyclic redundancy code (CRC);
reporting an echo reply was received with bad disparity; and
reporting an echo reply was received with an end of frame abort frame delimiter (EOFTA).

13. A non-transitory computer-usable medium embodying computer program code, the computer program code comprising computer executable instructions configured for:
generating data patterns to assure that link receivers and transmitters within a storage area network are functioning properly; the data patterns comprising data patterns known to potentially induce jitter within the storage area network;
sending the data patterns via an echo extended link service operation;
monitoring results of the echo extended link service operation to determine whether the sending was successful, the sending being successful when the sending conforms to a network specification across the storage area network; and,
reporting whether the sending was successful.

14. The non-transitory computer-usable medium of claim 13, wherein:

the storage area network comprises at least one of a Fibre Channel type storage area network and a fiber connectivity (FICON) type storage area network.

15. The non-transitory computer-usable medium of claim 13, wherein the embodied computer program code for generating further comprises computer executable instructions configured for:

automatically generating sequential data patterns; and, generating data patterns specified by a user.

16. The non-transitory computer-usable medium of claim 15, wherein:

the automatically generating sequential data patterns further comprises sending a plurality of random data patterns using random frame sizes and random numbers of frames; and, the generating data patterns specified by a user further comprises specifying a range of data patterns to use and how much data to send for the range of data patterns.

17. The non-transitory computer-usable medium of claim 13, wherein the embodied computer program code further comprises computer executable instructions configured for:

performing a setup operation prior to sending the data patterns, the setup operation comprising performing fabric and port login operations and device discovery operations.

18. The non-transitory computer-usable medium of claim 13, wherein the embodied computer program code for reporting further comprises computer executable instructions configured for:

reporting that jitter indicated because known jitter patterns failed or no indication of a jitter problem;

reporting a reply to the echo extended link service was not received within a time-out period;

reporting an echo reply was received with a bad cyclic redundancy code (CRC);

reporting an echo reply was received with bad disparity; and reporting an echo reply was received with an end of frame abort frame delimiter (EOFTA).

* * * * *